United States Patent
Yau et al.

(10) Patent No.: US 12,520,864 B2
(45) Date of Patent: Jan. 13, 2026

(54) XIAOLONGBAO COMPRISING CARRAGEENAN AS THE GELLING AGENT IN THE FILLING

(71) Applicant: The XCJ Corp., Auburn, WA (US)

(72) Inventors: Josh Yau, Renton, WA (US); Zhaozhi Huang, Bellevue, WA (US); Jennifer Liao, Bellevue, WA (US); Caleb Wang, Bellevue, WA (US); Yujing Zhu, Tacoma, WA (US)

(73) Assignee: The XCJ Corp., Auburn, WA (US)

( * ) Notice: Subject to any disclaimer, the term of this patent is extended or adjusted under 35 U.S.C. 154(b) by 0 days.

(21) Appl. No.: 18/485,991

(22) Filed: Oct. 12, 2023

(65) Prior Publication Data

US 2024/0057650 A1    Feb. 22, 2024

Related U.S. Application Data

(62) Division of application No. 18/365,012, filed on Aug. 3, 2023, and a division of application No. PCT/US2023/071603, filed on Aug. 3, 2023.

(60) Provisional application No. 63/399,527, filed on Aug. 19, 2022.

(51) Int. Cl.
  *A23L 29/231*   (2016.01)
  *A21D 13/19*   (2017.01)

(52) U.S. Cl.
  CPC .......... *A23L 29/231* (2016.08); *A21D 13/19* (2017.01)

(58) Field of Classification Search
  None
  See application file for complete search history.

(56) References Cited

U.S. PATENT DOCUMENTS

| | | |
|---|---|---|
| 6,093,439 A | 7/2000 | Whaley |
| 7,338,679 B2 * | 3/2008 | Uchida ............... A23L 21/18 426/577 |
| 8,192,778 B2 | 6/2012 | Kopesky |
| 2002/0019447 A1 | 2/2002 | Renn |
| 2004/0161502 A1 | 8/2004 | Enz et al. |
| 2008/0311247 A1 | 12/2008 | Inoue |
| 2009/0318571 A1 | 12/2009 | Utz |
| 2013/0236623 A1 | 9/2013 | Lagarrigue et al. |
| 2013/0295264 A1 | 11/2013 | Lagarrigue et al. |
| 2014/0322282 A1 | 10/2014 | Tuason |
| 2017/0251692 A1 | 9/2017 | Yaranossian |
| 2018/0168198 A1 | 6/2018 | Petralia |
| 2024/0057649 A1 | 2/2024 | Yau |

FOREIGN PATENT DOCUMENTS

| | | |
|---|---|---|
| JP | 2006296384 A | 11/2006 |
| WO | 200036930 A1 | 6/2000 |
| WO | 2014199985 A1 | 12/2014 |
| WO | 2020178718 A1 | 9/2020 |
| WO | 2024039972 A1 | 2/2024 |

OTHER PUBLICATIONS

"International Search Report of the International Searching Authority," issued in connection with Int'l Appl. No. PCT/US2023/071603, dated Nov. 20, 2023 (3 pages).
Alipal, J. et al. (2021, e-pub. Feb. 13, 2021). "A Review Of Gelatin: Properties, Sources, Process, Applications, and Commercialisation," Materials Today: Proceedings 42:240-250.
Bagal-Kestwal, D.R. et al. (2019). "Properties and Applications of Gelatin, Pectin, and Carrageenan Gels," Chapter 6 in Bio Monomers for Green Polymeric Composite Materials, Visakh, P.M. ed., John Wiley and Sons Ltd., pp. 117-140.
Fenton, T. et al. (2021, e-pub. May 10, 2021). "Formulation And Additive Manufacturing Of Polysaccharide-Surfactant Hybrid Gels As Gelatin Analogues In Food Applications," Food Hydrocolloids 120:106881, 9 pages.
Jayakody, M.M. et al. (2023, e-pub. May 26, 2022). "Hydrocolloid And Water Soluble Polymers Used In The Food Industry And Their Functional Properties: A Review," Polymer Bulletin 80:3585-3610, 26 pages.
Karim, A.A. et al. (2008). "Gelatin Alternatives For The Food Industry: Recent Developments, Challenges, and Prospects," Trends in Food Science & Technology 19:644-656.
Morrison, N.A. et al. (Dec. 1999). "Gelatin Alternatives For The Food Industry," Progress in Colloid & Polymer Science 114:127-131.
Saha, D. et al. (Nov-Dec. 2010, e-pub. Nov. 6, 2010). "Hydrocolloids As Thickening And Gelling Agents In Food: A Critical Review," J. Food Science Technology 47(6):587-597.
Uddin, S.M.K. et al. (2021, e-pub. Oct. 23, 2021). "Halal And Kosher Gelatin: Applications As Well As Detection Approaches With Challenges And Prospects," Food Bioscience 44:101422, 14 pages.
Zia, K.M. et al. (2017, e-pub. Nov. 30, 2016). "A Review On Synthesis, Properties And Applications Of Natural Polymer Based Carrageenan Blends And Composites," International Journal of Biological Macromolecules 96:282-301.
U.S. Appl. No. 19/059,919, filed Feb. 21, 2025, for Josh Yau et al.

\* cited by examiner

*Primary Examiner* — Lien T Tran
(74) *Attorney, Agent, or Firm* — Morrison & Foerster LLP

(57) ABSTRACT

Various aspects of the disclosure relate to food, specifically a xiaolongbao or "soup dumpling" comprising (i) an outer layer comprising flour or dough and (ii) a filling comprising a gel filling comprising carrageenan as a gelling agent, in which the gel filling is a thermally-reversible gel. Food comprising such gel fillings can be vegetarian or vegan and advantageously allow the re-solidification of the gelling agent following heating to reform the gel filling in the heated food.

7 Claims, No Drawings

XIAOLONGBAO COMPRISING CARRAGEENAN AS THE GELLING AGENT IN THE FILLING

CROSS-REFERENCE TO RELATED APPLICATIONS

This application is a divisional of U.S. patent application Ser. No. 18/365,012, entitled "FOODS COMPRISING THERMALLY-REVERSIBLE CARRAGEENAN AND PECTIN GEL FILLINGS AND RELATED METHODS," filed Aug. 3, 2023 Now Pending, and International Patent Application No. PCT/US2023/071603, entitled "FOODS COMPRISING THERMALLY-REVERSIBLE CARRAGEENAN AND PECTIN GEL FILLINGS AND RELATED METHODS," filed Aug. 3, 2023, which claim priority to U.S. Provisional Application No. 63/399,527, entitled "FOODS COMPRISING THERMALLY-REVERSIBLE CARRAGEENAN AND PECTIN GEL FILLINGS AND RELATED METHODS," filed Aug. 19, 2022, which are incorporated by reference herein in their entirety.

BACKGROUND

The use of vegetable-based gels in heated food products is limiting, for example, because heating a vegetable-based gel can irreversibly convert the gel into a liquid. Thermally-reversible vegetable-based gels are desirable, for example, for use in vegetarian and vegan foods.

SUMMARY

Various aspects of the disclosure relate to food comprising (i) an outer layer comprising flour or dough and (ii) a filling comprising a gel filling comprising a gelling agent selected from one or both of carrageenan and low methoxyl pectin, in which the gel filling is a thermally-reversible gel. Food comprising such gel fillings can be vegetarian or vegan and advantageously allow the re-solidification of the gelling agent following heating to reform the gel filling in the heated food. The food may be, for example, a dumpling or an xiaolongbao.

The gel filling comprises, by definition, a liquid phase and a solid phase, in which the liquid phase is dispersed within the solid phase. The gel fillings of the disclosure are thermally-reversible gels because both (i) a gel filling can be heated to partition the gelling agent from the solid phase to the liquid phase such that the liquid phase is no longer dispersed within the solid phase, and (ii) the heated gel filling can then be cooled to partition the gelling agent from the liquid phase to the solid phase such that the liquid phase again becomes dispersed within the solid phase.

Various aspects of the disclosure relate to methods to prepare a heated food for consumption, comprising providing a food described anywhere in the disclosure; heating the food to partition the gelling agent from the solid phase to the liquid phase such that the liquid phase is no longer dispersed within the solid phase; and cooling the heated food to partition the gelling agent from the liquid phase to the solid phase such that the liquid phase again becomes dispersed within the solid phase.

Various aspects of the disclosure relate to methods to prepare a food described anywhere in in this disclosure, comprising dissolving a cation in an aqueous solution to produce a stock solution; dissolving a gelling agent in the stock solution to produce a gel solution, wherein the stock solution is maintained at a temperature of at least 35 degrees Celsius while the gelling agent is dissolved in the stock solution; cooling the gel solution to produce a gel filling; preparing a filling from the gel filling, wherein the filling comprises a portion of the gel filling and optionally one or more solid food ingredients; and covering the filling with an outer layer comprising a flour or dough to produce either the food or a manufacturing intermediate from which the food is prepared.

DETAILED DESCRIPTION

Various aspects of the disclosure relate to a food, comprising (i) an outer layer comprising a flour or dough and (ii) a filling comprising a gel filling, wherein the outer layer partially or completely surrounds the gel filling. The food may be, for example, a dumpling or an xiaolongbao.

The gel filling comprises a gelling agent, a cation, and water.

"Comprise" refers to an open set. A gel filling that comprises a gelling agent, a cation, and water can also comprise, for example, an anion.

The gelling agent comprises one or both of carrageenan and low methoxyl pectin. When the gelling agent comprises carrageenan, then the gel filling comprises the carrageenan at a concentration of at least 0.1 percent and no greater than 2 percent by mass. When the gelling agent comprises low methoxyl pectin, then the gel filling comprises the low methoxyl pectin at a concentration of at least 0.3 percent and no greater than 5 percent by mass.

The gel filling comprises a liquid phase and a solid phase, wherein the liquid phase is dispersed within the solid phase.

In some embodiments, the liquid phase comprises a majority of the water of the gel filling. In some specific embodiments, the liquid phase comprises at least 90 percent of the water of the gel filling.

In some embodiments, the solid phase comprises a majority of the gelling agent of the gel filling. In some specific embodiments, the solid phase comprises at least 90 percent of the gelling agent of the gel filling.

The gel filling is a thermally-reversible gel because both (i) the gel filling can be heated to partition the gelling agent from the solid phase to the liquid phase such that the liquid phase is no longer dispersed within the solid phase, and (ii) the heated gel filling can then be cooled to partition the gelling agent from the liquid phase to the solid phase such that the liquid phase again becomes dispersed within the solid phase. In some embodiments, both (i) the gel filling can be heated to partition at least 90 percent of the gelling agent from the solid phase to the liquid phase such that the liquid phase is no longer dispersed within the solid phase, and (ii) the heated gel filling can then be cooled to partition at least 90 percent of the gelling agent from the liquid phase to the solid phase such that the liquid phase again becomes dispersed within the solid phase.

In some embodiments, the outer layer surrounds at least 50 percent the gel filling. In some specific embodiments, the outer layer surrounds at least 90 percent the gel filling. In some very specific embodiments, the outer layer completely surrounds the gel filling.

In some embodiments, the gelling agent comprises carrageenan, and the gel filling comprises the carrageen at a concentration of at least 0.2 percent and no greater than 1 percent by mass.

In some embodiments, the gelling agent comprises low methoxyl pectin, and the gel filling comprises the low methoxyl pectin at a concentration of at least 0.5 and no greater than 3 percent by mass.

In some embodiments, the cation is calcium. In some specific embodiments, the gel filling comprises calcium at a concentration of at least 200 parts per million and no greater than 0.15 percent by mass.

In some embodiments, the cation is magnesium. In some specific embodiments, the gel filling comprises magnesium at a concentration of at least 400 and no greater than 0.3 percent by mass.

In some embodiments, the cation is potassium. In some specific embodiments, the gel filling comprises potassium at a concentration of at least 400 and no greater than 0.3 percent by mass.

When the gelling agent comprises low methoxyl pectin and lacks carrageenan, then the cation is preferably a divalent cation such as calcium or magnesium.

In some embodiments, the gel filling comprises water at a concentration of at least 50 percent. In some specific embodiments, the gel filling comprises water at a concentration of at least 70 percent. In some very specific embodiments, the gel filling comprises water at a concentration of at least 90 percent.

In some embodiments, the gel filling comprises locust bean gum. In some specific embodiments, the gel filling comprises locust bean gum at a concentration of at least 500 parts per million and no greater than 0.6 percent by mass.

In some embodiments, the filing comprises one or more solid food ingredients selected from fruits, vegetables, nuts, and meats.

In some embodiments, the food is vegetarian because the food lacks any ingredient that is an animal meat.

In some embodiments, the food is vegan because the food lacks any ingredient that is an animal product.

In some embodiments, (i) the gel filling can be heated to a temperature of at least 90 and no greater than 110 degrees Celsius to partition the gelling agent from the solid phase to the liquid phase such that the liquid phase is no longer dispersed within the solid phase, and (ii) the heated gel filling can then be cooled at a temperature of at least 18 and no greater than 27 degrees Celsius over a period of time to partition the gelling agent from the liquid phase to the solid phase such that the liquid phase again becomes dispersed within the solid phase; wherein the period of time is no greater than 15 minutes. In some specific embodiments, (i) the gel filling can be heated to a temperature of 100 degrees Celsius to partition the gelling agent from the solid phase to the liquid phase such that the liquid phase is no longer dispersed within the solid phase, and (ii) the heated gel filling can then be cooled at a temperature of 21 degrees Celsius over a period of time to partition the gelling agent from the liquid phase to the solid phase such that the liquid phase again becomes dispersed within the solid phase; wherein the period of time is no greater than 15 minutes.

In some specific embodiments, the period of time is no greater than 10 minutes. In some very specific embodiments, the period of time is no greater than 5 minutes.

Various aspects of the disclosure relate to a method to prepare a heated food for consumption, comprising providing a food described anywhere in the disclosure; heating the food to partition the gelling agent from the solid phase to the liquid phase such that the liquid phase is no longer dispersed within the solid phase; and cooling the heated food to partition the gelling agent from the liquid phase to the solid phase such that the liquid phase again becomes dispersed within the solid phase. In some embodiments, the method comprises (i) heating the food to partition at least 90 percent of the gelling agent from the solid phase to the liquid phase such that the liquid phase is no longer dispersed within the solid phase and (ii) cooling the heated food to partition at least 90 percent of the gelling agent from the liquid phase to the solid phase such that the liquid phase again becomes dispersed within the solid phase.

In some embodiments, the heating comprises convective heating. In some specific embodiments, the heating comprises steaming the food. In some specific embodiments, the heating comprises baking the food.

In some embodiments, the heating comprises radiative heating. In some specific embodiments, the heating comprises microwaving the food.

In some embodiments, the heating comprises conductive heating. In some specific embodiments, the heating comprises frying the food.

In some embodiments, cooling the heated food comprises cooling the heated food at a temperature of at least 18 degrees Celsius and no greater than 27 degrees Celsius; the heated food is cooled over a period of time that is sufficient to partition the gelling agent from the liquid phase to the solid phase such that the liquid phase again becomes dispersed within the solid phase; and the period of time is no greater than 15 minutes. In some specific embodiments, the period of time is no greater than 10 minutes. In some very specific embodiments, the period of time is no greater than 5 minutes.

Various aspects of the disclosure relate to a method to prepare a food, comprising (i) dissolving a cation in an aqueous solution to produce a stock solution; (ii) dissolving a gelling agent in the stock solution to produce a gel solution, wherein the stock solution is maintained at a temperature of at least 35 degrees Celsius while the gelling agent is dissolved in the stock solution; (iii) cooling the gel solution to produce a gel filling; (iv) preparing a filling from the gel filling, wherein the filling comprises a portion of the gel filling and optionally one or more solid food ingredients; and (v) covering the filling with an outer layer comprising a flour or dough to produce either the food or a manufacturing intermediate from which the food is prepared.

The gelling agent comprises one or both of carrageenan and low methoxyl pectin. When the gelling agent comprises carrageenan, then the gelling agent is dissolved in the stock solution such that the gel filling comprises the carrageenan at a concentration of at least 0.1 percent and no greater than 2 percent by mass. When the gelling agent comprises low methoxyl pectin, then the gelling agent is dissolved in the stock solution such that the gel filling comprises the low methoxyl pectin at a concentration of at least 0.3 percent and no greater than 5 percent by mass.

In some embodiments, the method is performed such that the gel filling comprises a liquid phase and a solid phase, in which the liquid phase is dispersed within the solid phase. In some embodiments, the method is performed such that the liquid phase comprises a majority of the water of the gel filling. In some specific embodiments, the method is performed such that the liquid phase comprises at least 90 percent of the water of the gel filling.

In some embodiments, the method is performed such that the solid phase comprises a majority of the gelling agent of the gel filling. In some specific embodiments, the method is performed such that the solid phase comprises at least 90 percent of the gelling agent of the gel filling.

In some embodiments, the method is performed such that the gel filling is a thermally-reversible gel because both (i) the gel filling can be heated to partition the gelling agent from the solid phase to the liquid phase such that the liquid phase is no longer dispersed within the solid phase, and (ii) the heated gel filling can then be cooled to partition the gelling agent from the liquid phase to the solid phase such that the liquid phase again becomes dispersed within the solid phase. In some specific embodiments, both (i) the gel filling can be heated to partition at least 90 percent of the gelling agent from the solid phase to the liquid phase such that the liquid phase is no longer dispersed within the solid phase, and (ii) the heated gel filling can then be cooled to partition at least 90 percent of the gelling agent from the liquid phase to the solid phase such that the liquid phase again becomes dispersed within the solid phase.

In some embodiments, the gelling agent comprises carrageenan, and the gelling agent is dissolved in the stock solution such that the gel filling comprises the carrageen at a concentration of at least 0.2 percent and no greater than 1 percent by mass.

In some embodiments, the gelling agent comprises low methoxyl pectin, and the gelling agent is dissolved in the stock solution such that the gel filling comprises the low methoxyl pectin at a concentration of at least 0.5 and no greater than 3 percent by mass.

In some embodiments, the cation is calcium. In some specific embodiments, the cation is dissolved in the aqueous solution such that the gel filling comprises calcium at a concentration of at least 200 parts per million and no greater than 0.15 percent by mass.

In some embodiments, the cation is magnesium. In some specific embodiments, the cation is dissolved in the aqueous solution such that the gel filling comprises magnesium at a concentration of at least 400 and no greater than 0.3 percent by mass.

In some embodiments, the cation is potassium. In some specific embodiments, the cation is dissolved in the aqueous solution such that the gel filling comprises potassium at a concentration of at least 400 and no greater than 0.3 percent by mass.

When the gelling agent comprises low methoxyl pectin and lacks carrageenan, then the cation is preferably a divalent cation such as calcium or magnesium.

In some embodiments, the method comprises activating locust bean gum in water at a temperature of at least 75 degrees Celsius to produce the aqueous solution, wherein the method is performed such that the gel filling comprises the locust bean gum at a concentration of at least 500 parts per million and no greater than 0.6 percent by mass.

In some embodiments, preparing the filling from the gel filling comprises combining one or more solid food ingredients selected from fruits, vegetables, nuts, and meats with either the gel filling or the portion of the gel filling.

In some embodiments, the food is vegetarian because the method lacks the incorporation of any ingredient into the food that is an animal meat.

In some embodiments, the food is vegan because the method lacks the incorporation of any ingredient into the food that is an animal product.

In some embodiments, (i) the gel filling can be heated to a temperature of at least 90 and no greater than 110 degrees Celsius to partition the gelling agent from the solid phase to the liquid phase such that the liquid phase is no longer dispersed within the solid phase, and (ii) the heated gel filling can then be cooled at a temperature of at least 18 and no greater than 27 degrees Celsius over a period of time to partition the gelling agent from the liquid phase to the solid phase such that the liquid phase again becomes dispersed within the solid phase, wherein the period of time is no greater than 15 minutes. In some specific embodiments, (i) the gel filling can be heated to a temperature of 100 degrees Celsius to partition the gelling agent from the solid phase to the liquid phase such that the liquid phase is no longer dispersed within the solid phase, and (ii) the heated gel filling can then be cooled at a temperature of 21 degrees Celsius over a period of time to partition the gelling agent from the liquid phase to the solid phase such that the liquid phase again becomes dispersed within the solid phase, wherein the period of time is no greater than 15 minutes.

In some specific embodiments, the period of time is no greater than 10 minutes. In some very specific embodiments, the period of time is no greater than 5 minutes.

Various aspects of the disclosure relate to food prepared according to a method described anywhere in the disclosure, wherein: the food comprises a filling that comprises a gel filling that comprises a liquid phase and a solid phase, in which the liquid phase is dispersed within the solid phase; the gel filling comprises a gelling agent; the solid phase comprises a majority of the gelling agent of the gel filling; and the gel filling is a thermally-reversible gel because both (i) the gel filling can be heated to partition the gelling agent from the solid phase to the liquid phase such that the liquid phase is no longer dispersed within the solid phase, and (ii) the heated gel filling can then be cooled to partition the gelling agent from the liquid phase to the solid phase such that the liquid phase again becomes dispersed within the solid phase.

In some embodiments, the solid phase comprises at least 90 percent of the gelling agent of the gel filling.

In some specific embodiments, both (i) the gel filling can be heated to partition at least 90 percent of the gelling agent from the solid phase to the liquid phase such that the liquid phase is no longer dispersed within the solid phase, and (ii) the heated gel filling can then be cooled to partition at least 90 percent of the gelling agent from the liquid phase to the solid phase such that the liquid phase again becomes dispersed within the solid phase.

In some embodiments, (i) the gel filling can be heated to a temperature of at least 90 and no greater than 110 degrees Celsius to partition the gelling agent from the solid phase to the liquid phase such that the liquid phase is no longer dispersed within the solid phase, and (ii) the heated gel filling can then be cooled at a temperature of at least 18 and no greater than 27 degrees Celsius over a period of time to partition the gelling agent from the liquid phase to the solid phase such that the liquid phase again becomes dispersed within the solid phase, wherein the period of time is no greater than 15 minutes. In some specific embodiments, (i) the gel filling can be heated to a temperature of 100 degrees Celsius to partition the gelling agent from the solid phase to the liquid phase such that the liquid phase is no longer dispersed within the solid phase, and (ii) the heated gel filling can then be cooled at a temperature of 21 degrees Celsius over a period of time to partition the gelling agent from the liquid phase to the solid phase such that the liquid phase again becomes dispersed within the solid phase, wherein the period of time is no greater than 15 minutes.

In some specific embodiments, the period of time is no greater than 10 minutes. In some very specific embodiments, the period of time is no greater than 5 minutes.

The following Example provides a framework to implement various aspects of the disclosure, and this Example does not limit any aspect of the disclosure or any patent claim that matures from this patent document.

Salt(s) comprising one, two, or each of calcium cation, magnesium cation, and potassium cation are added to the aqueous solution to produce a stock solution. The stock solution is maintained at a temperature of greater than 35 degrees Celsius.

One or both of carrageenan and low methoxyl pectin are dissolved in the stock solution while the stock solution is maintained at a temperature of greater than 35 degrees Celsius to produce a gel solution.

The gel solution is cooled at a temperature of 4 degrees Celsius to produce a gel filling.

Either the gel solution or the gel filling is optionally combined with one or more flavors, seasonings, colorings, preservatives, and solid food ingredients such as fruits, vegetables, nuts, and meats.

A dough is prepared comprising flour, water, vegetable oil, and salt.

Portions of the gel filling are covered with an outer layer comprising the dough to produce a manufacturing intermediate.

A food such as a dumpling or xiaolongbao is prepared from the manufacturing intermediate.

The gel filling of a dumpling or xiaolongbao is a thermally-reversible gel as described elsewhere in this disclosure.

Relative proportions of ingredients are set forth in Table 1 below for selected gel fillings that are thermally-reversible gels. The relative proportions of carrageenan, pectin, calcium, magnesium, and potassium are result-effective variables for producing thermally-reversible gels, and the relative proportion of locust bean gum is a result-effective variable for improving gel strength and elasticity. Other ingredients of a gel filling include water, which is generally present at a concentration of greater than 90 percent by mass.

TABLE 1

Concentrations by Mass and Combinations of Gelling Agents, Cations, and Locust Bean Gum that Allow the Manufacture of Thermally-Reversible Gel Fillings

| Thermally-Reversible Embodiment: | 1 | 2 | 3 | 4 | 5 | 6 | 7 | 8 | 9 | 10 | 11 | 12 | 13 |
|---|---|---|---|---|---|---|---|---|---|---|---|---|---|
| 0.2 to 1.0 Percent Carrageenan | • | • | • | • | • | • |   |   |   |   | • | • | • |
| 0.5 to 3.0 Percent Low Methoxyl Pectin |   |   |   |   |   |   | • | • | • | • | • | • | • |
| 0.02 to 0.15 Percent Calcium | • |   | • |   |   |   | • |   | • |   | • |   |   |
| 0.04 to 0.30 Percent Magnesium |   | • |   | • |   |   | • |   | • |   |   | • |   |
| 0.04 to 0.30 Percent Potassium |   |   |   |   | • |   |   | • |   |   |   |   | • |
| 0.05 to 0.30 Percent Locust Bean Gum |   |   |   | • | • | • |   |   |   |   |   |   |   |
| 0.50 to 0.30 Percent Locust Bean Gum |   |   |   |   |   |   |   |   |   |   | • | • | • |
| 0.10 to 0.60 Percent Locust Bean Gum |   |   |   |   |   |   |   |   | • | • |   |   |   |

Exemplification

The Example. Preparation of Foods Comprising Thermally-Reversible Carrageenan- and Pectin-Based Gel Fillings Locust bean gum is optionally activated in water at a temperature of greater than 75 degrees Celsius to produce an aqueous solution. Locust bean gum is a result-effective variable that can improve the gel strength and elasticity of carrageen and low-methoxyl-pectin gels, but locust bean gum is unnecessary to prepare thermally-reversible gel fillings. The aqueous solution can optionally lack locust bean gum.

What is claimed is:

1. A steamed xiaolongbao, comprising: a steamed outer dough layer partially or completely surrounding a heated filling, wherein the heated filling comprises (i) one or more solid food ingredients selected from the group consisting of fruit and vegetable or a combination thereof, and (ii) a heated gel filling comprising carrageenan, locust bean gum, cation, and water, wherein the gel filling has a liquid phase and a solid phase such that the liquid phase is not dispersed within the solid phase of the heated gel filling; and wherein the gel filling is thermally-reversible such that when the steamed xiaolongbao is cooled to a temperature between 18 degrees Celsius and 27 degrees Celsius over 15 minutes, the liquid phase is dispersed within the solid phase of the gel filling.

2. The steamed xiaolongbao of claim 1, wherein the heated filling further comprises one or more flavors, seasonings, colorings, and preservatives.

3. The steamed xiaolongbao of claim 1, wherein the cation is a divalent cation.

4. The steamed xiaolongbao of claim 1, wherein the cation is calcium.

5. The steamed xiaolongbao of claim 1, wherein the steamed xiaolongbao is vegetarian or vegan.

6. The steamed xiaolongbao of claim 1, wherein the steamed xiaolongbao lacks any ingredient that is an animal meat.

7. The steamed xiaolongbao of claim 1, wherein the steamed xiaolongbao lacks any ingredient that is an animal product.

\* \* \* \* \*